United States Patent [19]

Scott

[11] Patent Number: 4,824,572

[45] Date of Patent: Apr. 25, 1989

[54] METHOD AND APPARATUS FOR TREATING HOUSEHOLD WASTE WATER

[76] Inventor: Richard E. Scott, P.O. Box 18, Rockaway Beach, Mo. 65740

[21] Appl. No.: 176,690

[22] Filed: Apr. 1, 1988

[51] Int. Cl.$^4$ ............................. C02F 3/32; C02F 9/00
[52] U.S. Cl. ....................................... 210/602; 47/62; 210/747; 210/754; 210/807; 210/170; 210/206; 210/259; 210/290
[58] Field of Search .................... 47/62; 210/602, 747, 210/754, 767, 807, 150, 151, 170, 205, 206, 259, 290, 291, 532.2

[56] References Cited

U.S. PATENT DOCUMENTS

| | | | |
|---|---|---|---|
| 681,884 | 9/1901 | Monjeau | 210/602 |
| 3,770,623 | 11/1973 | Seidel | 47/62 |
| 4,100,073 | 7/1978 | Hopcroft | 210/532.2 |
| 4,415,450 | 11/1983 | Wolverton | 210/602 |
| 4,678,582 | 7/1987 | Lavigne | 210/170 |

Primary Examiner—Ivars Cintins
Attorney, Agent, or Firm—Kokjer, Kircher, Bradley, Wharton, Bowman & Johnson

[57] ABSTRACT

A waste water treatment facility includes a gravity flow treatment bed which receives waste effluent from a plurality of individual septic tanks. The treatment bed includes a bottom layer of small gravel particles, a layer of larger gravel particles covering the bottom layer, a strip of crushed limestone, a layer of straw or hay on the large gravel layer, and a layer of topsoil in which reeds are planted for treating the effluent. A perforated header pipe distributes the incoming effluent across the bed, and a perforated collection pipe collects the treated effluent and delivers it to a sump. The effluent passes from the sump through a chlorinator and a chlorine contact chamber before being discharged to the ground.

20 Claims, 2 Drawing Sheets

METHOD AND APPARATUS FOR TREATING HOUSEHOLD WASTE WATER

BACKGROUND AND SUMMARY OF THE INVENTION

This invention relates generally to the treatment of waste and more particularly to the treatment of waste generated in residential dwellings.

It has long been known that reeds such as fragmites and bull rushes can be used in filtration beds to remove dissolved pollutants and pathogenic organisms from waste materials. The pollutants are used by the plants as nutrients, and the roots of the reeds filter the water and remove pollutants from it. As exemplified by U.S. Pat. No. 3,770,623 to Seidel, reed beds have been used in the past to treat industrial wastes. However, reed bed treatment facilities have not been wholly free of problems.

One of the most difficult problems involves assuring that the reed plants become established. Successful and efficient operation of the treatment bed requires that the roots penetrate to the bottom of the bed so that they grow thickly and densely. This necessitates that the reeds be planted in high quality top soil and at the same time requires the bottom part of the bed to allow penetration of the roots as well as adequate flow of the effluent. Additionally, the bottom part of the bed should perform a filtering function while the reeds are becoming established. Precautions must also be taken to assure that the top soil does not unduly leach down into the bottom layers of the bed before the plants have become established. Finally, the acid content of the waste should be neutralized in the treatment bed so that acidic solutions are not discharged to the surrounding environment.

The present invention provides an improved method and apparatus for treating wastes and particularly sewage generated in households. In accordance with the invention, each residence is equipped with a septic tank which must only be large enough to handle about one day's quantity of waste. The effluent from each septic tank is directed into a single large reed bed by a piping system that may include standard 2-4 inch plastic plumbing pipes.

The treatment bed is a gravity flow facility having a sloping concrete floor and walls about 2 feet high. A perforated header pipe extends across the high end of the bed to receive the incoming effluent from the septic tanks and distribute it across the width of the bed. The reed bed contains materials arranged in a special matrix which accommodates rapid and thick growth of reeds while at the same time allowing adequate gravity flow of effluent through the bed. A relatively thin layer of small gravel particles covers the floor of the treatment bed and is in turn covered by a thicker layer of larger gravel particles. A transverse strip of crushed limestone occupies part of the gravel layer and acts to neutralize the acidity of the effluent. A layer of hay or straw which overlies the larger gravel layer is covered by a layer of top soil in which the reeds are planted.

This special matrix has a number of advantages. The bottom layer of small gravel particles serves as a sand filter which filters the sewage during the time the reeds are becoming established. The larger gravel allows easy penetration of the roots and permits the effluent to flow through the bed in the desired manner. The crushed limestone serves the same purpose as the large gravel and additionally provides an alkaline presence to neutralize any acids that are present in the effluent. The hay or straw supports the top soil and prevents it from leaching unduly into the gravel where it could clog the gravel and restrict the flow of effluent through the bed. The top soil must remain in place on the hay or straw to provide nourishment for the reeds until their roots have spread out through the lower layers and become firmly established therein.

At the lower end of the reed bed, a perforated collection pipe extends transversely to collect the treated effluent and direct it into a sump located at one corner of the bed. A discharge pipe which delivers the effluent to the sump includes a riser pipe which controls the liquid level in the treatment bed. Downstream from the sump and arranged serially are a chlorinator and a chlorine contact chamber which provide chemical treatment and then discharge the treated water to the ground.

DETAILED DESCRIPTION OF THE INVENTION

Figure 1:
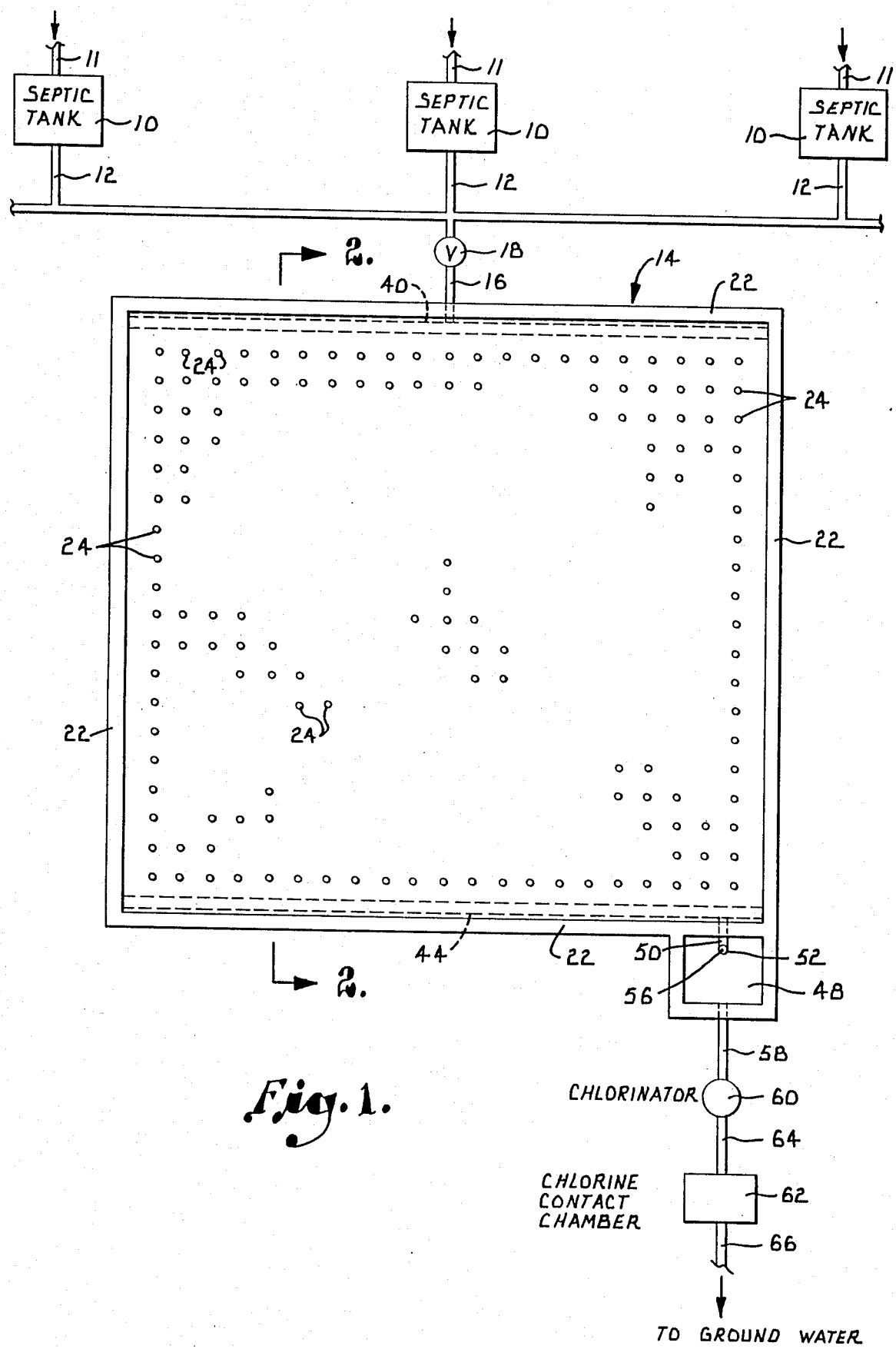
Figure 2:
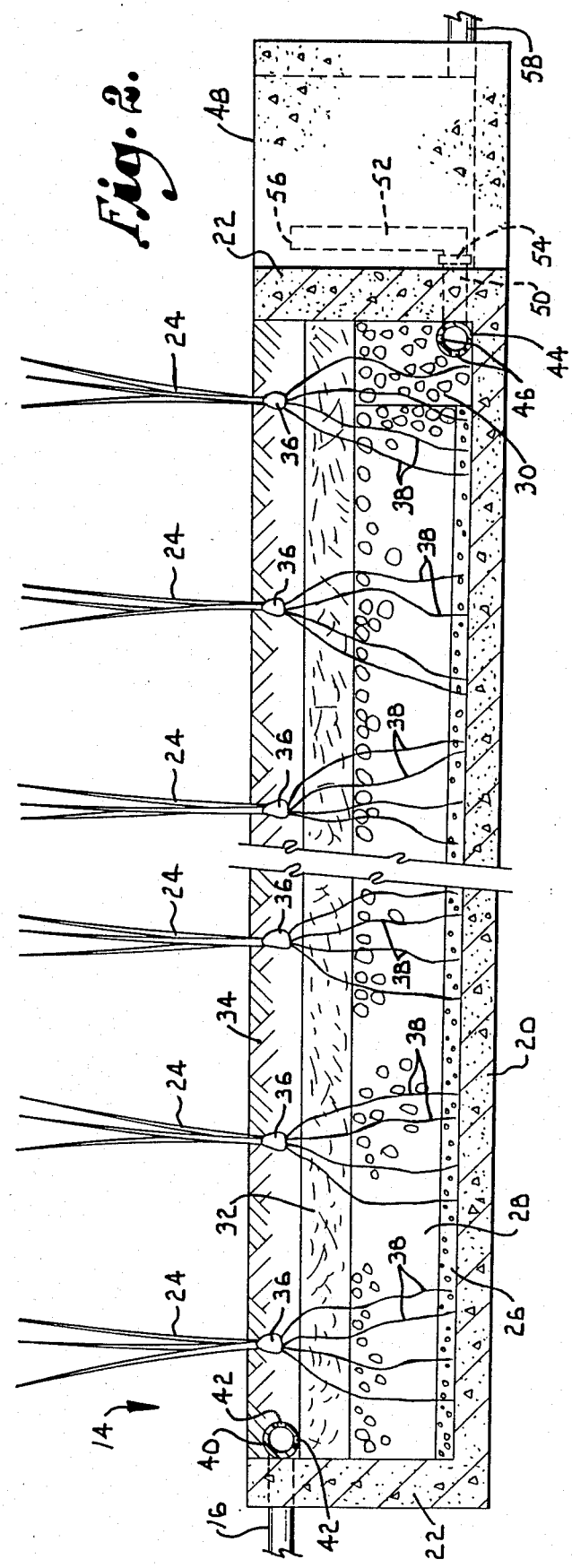

In the accompanying drawings which form a part of the specification and are to be read in conjunction therewith and in which like reference numerals are used to indicate like parts in the various views:

FIG. 1 is a top plan view of a household waste treatment facility constructed according to a preferred embodiment of the present invention; and FIG. 2 is a fragmentary sectional view on an enlarged scale taken generally along line 2—2 of FIG. 1 in the direction of the arrows, with the break lines indicating continuous extension of the treatment bed.

Referring now to the drawings in more detail and initially to FIG. 1, the present invention provides a facility which is used to treat the waste materials generated by residential dwellings. Each residence which makes use of the treatment facility has its own individual septic tank 10 which is large enough to handle about one day's water use for the residents. The system typically includes a fairly large number of septic tanks which may be physically arranged in any desired manner. Each septic tank 10 has an inlet line 11 which delivers sewage from the residence to the septic tank. Each septic tank 12 has an outlet line which delivers the output effluent from the septic tank to a single large treatment bed generally identified by numeral 14. All of the septic tank outlet lines 12 connect with a pipe 16 which leads to the treatment bed 14. Preferably, pipe 16 is equipped with a valve 18 which controls the flow of effluent from the septic tanks to the treatment bed. The pipes 11, 12 and 16 may be conventional plastic drain pipes having a diameter of 2 inches, 3 inches or 4 inches, depending upon the specific needs of the system.

With additional reference to FIG. 2, the treatment bed 14 has a flat concrete floor 20 which may be approximately 4 inches thick. The floor 20 slopes downwardly from the high or inlet end (the top end as viewed in FIG. 1) to the low or outlet end (the bottom end as viewed in FIG. 1). Preferably, the slope of the floor is about 6 inches per 100 feet in length. Thus, if the treatment bed is 100 feet long, the high end of the floor 20 is approximately 6 inches higher than the low end. Because of the slope of the floor, the incoming effluent flows slowly through the bed from the high end toward the low end under the influence of gravity. Vertical walls 22 approximately 2 feet high and four inches thick extend upwardly from the perimeter of floor 20 on its sides and ends.

The treatment bed 14 contains a special matrix which is selected to promote the establishment of reed plants 24 in the bed. A bottom layer 26 of relatively small gravel particles covers the floor 20. The layer 26 should be about 2 inches thick, and the gravel particles it contains should be small enough to permit layer 26 to function as a sand filter for the sewage during the time the reeds 24 are becoming established.

A larger gravel layer 28 covers layer 26. Layer 28 is about 10 inches thick and should contain gravel particles about 1-2 inches in diameter. Because of the relatively large size of the particles in layer 28, adequate space is provided for the flow of sewage through the treatment bed and for the roots of the reeds 24 to grow through layer 28.

A transverse strip 30 of crushed limestone occupies part of the two gravel layers 26 and 28. FIG. 2 shows the strip 30 extending across the low end of the treatment bed. However, it is not necessary for strip 30 to be located at the low end of the bed and it can be located virtually anywhere along the length of the bed. Strip 30 should, however, extend transversely across the entire width of the treatment bed so that all of the effluent passing through the bed must also pass through the crushed limestone.

Overlying the larger gravel layer 28 is a layer 32 of hay or straw. Layer 32 may be about 6 inches thick. Lying on top of layer 32 is an upper layer 34 of high quality topsoil. The topsoil 34 is about 6 inches thick and should contain virtually no iron or aluminum. The top surface of layer 34 is approximately flush with or slightly below the top edges of the walls 22.

The reeds 24 are initially planted in the topsoil 34. The reeds may be fragmites or bullrushes, although other reed plants can also be used. The reeds 24 are preferably spaced uniformly apart, with one reed occupying about every two square feet of surface area in the treatment bed 14. The reeds have nodes 36 from which roots 38 grow. The nodes 36 are planted in the layer 34 of topsoil, and the roots 38 eventually grow downwardly through the underlying layers 32, 28 and 26 to the bottom of the treatment bed.

The treatment bed 14 is equipped with a perforated header pipe 40 which extends transversely across the high end of the treatment bed and is preferably located approximately 6 inches below the upper surface of the bed near the bottom of the topsoil layer 34. The inlet pipe 16 connects with the header pipe 40 near its midpoint. Pipe 40 is provided with a plurality of perforations 42 through which the effluent enters the treatment bed 14. In this manner, the effluent is distributed in a general uniform manner across the entire width of the treatment bed.

A perforated collection pipe 44 extends transversely across the treatment bed 14 at its low end. The collection pipe 44 is preferably located on the floor 20 of the bed adjacent the end wall. The collection pipe 44 has a plurality of perforations 46 through which the treated effluent enters the collection pipe. The header pipe 40 and collection pipe 44 may be 4 inch diameter plastic pipe.

The collection pipe 44 inclines downwardly from left to right as viewed in FIG. 1, so that its low end is adjacent to a sump 48. The sump 48 is formed by concrete walls and a concrete floor and is located at the low end of the treatment bed 14 near one corner. The horizontal discharge pipe 50 extends from the collection pipe 44 near its low end. Pipe 50 extends through wall 22 into the sump 48 and connects with a riser pipe 52 by means of a swivel fitting 54. Pipes 50 and 52 are solid pipes which deliver the treated effluent from the treatment bed into the sump 48. Pipe 52 is open at its upper or discharge end 56, and the height of the discharge end 56 controls the liquid level in the treatment bed 14. The discharge end 56 can be raised and lowered by pivoting pipe 52 upwardly and downwardly about the swivel connection 54.

The sump 48 has a discharge pipe 58 which extends to a chlorinator 60. The chlorinator should be sized for the daily flow expectations of the system. A chlorine contact chamber 62 is located downstream from the chlorinator 60 and is connected therewith by a pipe 64. Extending from the chlorinator 62 is an outlet pipe 66 which discharges the treated effluent to the surrounding ground water.

In operation, the waste that is generated in each residence is delivered to the corresponding septic tank 10 through line 11. The effluent from the septic tank 10 passes through pipes 12 and 16 to the header pipe 40 which applies the effluent to the high end of the treatment bed 14. The effluent passes through the treatment bed 14 under the influence of gravity from the high end to the low end and thereby trickle slowly through the matrix in the treatment bed and through the roots 38 of the reed plants 24. The roots 38 filter the effluent and remove pollutants and pathogenic organisms which serve as nutrients for the reeds. The treated effluent which reaches the low end of the treatment bed enters the collection pipe 44 through its perforations 46 and then passes into sump 48 through pipes 50 and 52. From the sump, the effluent flows to the chlorinator 60 and then to the chlorine contact chamber 62 for chemical treatment prior to being discharged to the surrounding environment through line 66.

In this manner, a single treatment bed 14 serves a large number of individual residences. As a general guideline, it is recommended that the treatment bed 14 present 50 square feet of surface area for each person it serves. Thus, a treatment bed that serves 200 persons should have a surface area of approximately 10,000 square feet which could be furnished by a bed 100 feet long and 100 feet wide.

The special matrix in the treatment bed 14 achieves numerous practical advantages. The high quality topsoil 54 provides the necessary nourishment for the reeds 24 when the are initially becoming established. The layer 32 of hay or straw holds the topsoil 54 and provides a buffer zone which prevents the topsoil from leaching down into the gravel layers 26 and 28 where the soil could possibly clog the gravel and restrict the sewage flow through the treatment bed. It takes a year or more for the hay or straw to decompose and by then, the reeds 24 have already become established with their roots 38 having grown down to the bottom of the treatment bed. The decomposed hay or straw then provides additional nourishment for the reeds.

The large gravel particles in layer 28 provide adequate space permitting the roots 38 to grow downwardly in the treatment bed. At the same time, the effluent is able to flow through the large gravel layer 28 without undue restriction. The bottom gravel layer 26 provides sand filtering of the sewage while the reeds are initially becoming established. The limestone strip 30 functions in the same manner as the large gravel layer 28 and additionally provides an alkaline presence which neutralizes any acid that is contained in the effluent. It is again noted that all of the effluent must pass through the limestone strip 30 as it flows through the treatment bed.

The matrix allows the roots 38 to quickly grow through the soil layer 34 of the hay or straw layer 32 and the gravel layers 28 and 26 to the bottom of the bed. Then, the roots 38 become thicker and more dense as time goes by, and this results in the reeds being able to more effectively treat the effluent each year. When the reeds are initially planted, the surface of the treatment bed should be watered daily until the plants have become established. In addition, the plants should be fed from below by maintaining the riser pipe 52 in a fully or nearly fully upright position to raise the water and sewage level in the treatment bed to the maximum height, where it can nourish the new roots that sprout from the nodes 36. From time to time, the liquid level in the treatment bed should be lowered by pivoting pipe 52 to a more horizontal position. By lowering the liquid level, the roots 38 must grow downwardly in order to seek nutrients, thus creating additional growth. Once the reeds 34 have become fully established, the treatment bed performs in a substantially maintenance free manner.

In colder climates, it may be necessary in the winter months to cover or temporarily enclose the treatment bed in order to protect the reed plants 24. This can be done in any of a variety of different ways.

It is thus evident that the present invention provides an improved method and apparatus for treating waste materials, especially household waste materials, in an effective way. The system operates entirely by gravity and requires no input power and little or no maintenance after the reed plants have established themselves in the matrix.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A gravity flow treatment facility for household waste water, comprising:
   a treatment bed having a water impervious floor sloping downwardly from a high end to a low end and water impervious walls extending around the floor;
   a layer of small gravel particles on the floor;
   a layer of large gravel particles on said layer of small gravel particles, said large gravel particles being larger than said small gravel particles;
   a strip of limestone in said layer of large gravel particles extending transversely across substantially the entirety of the treatment bed;
   a layer of straw or hay on said layer of large gravel particles;
   a layer of topsoil on said layer of straw or hay;
   a plurality of reed plants planted in said topsoil and having roots capable of penetrating the layer of straw or hay and the layers of large and small gravel particles;
   a perforated header pipe for receiving incoming waste water, said header pipe extending transversely across the bed at the high end thereof to distribute the waste water across the width of the bed; and
   a perforated collection pipe extending transversely across said bed at the low end thereof for receiving waste water that has passed through the bed, said collection pipe having an outlet for discharging the treated waste water.

2. The facility of claim 1, including a sump adjacent the low end of said treatment bed and a discharge pipe extending from the outlet of said collection pipe to the sump to deliver the treated waste water thereto, said discharge pipe including a riser having an open top end for controlling the liquid level in the treatment bed.

3. The facility of claim 2, including a chlorinator downstream from said sump and means for directing waste water from the sump to the chlorinator.

4. The facility of claim 3, including a chlorine contact chamber downstream from said chlorinator and means for directing waste water from said chlorinator to said chlorine contact chamber.

5. The facility of claim 1, wherein said layer of small gravel particles is approximately two inches thick.

6. The facility of claim 5, wherein said layer of large gravel particles is approximately ten inches thick.

7. The facility of claim 6, wherein said layer of hay or straw is approximately six inches thick.

8. The facility of claim 7, wherein said layer of topsoil is approximately six inches thick.

9. The facility of claim 1, wherein said layer of large gravel particles is approximately ten inches thick.

10. The facility of claim 9, wherein said layer of hay or straw is approximately six inches thick.

11. The facility of claim 10, wherein said layer of topsoil is approximately six inches thick.

12. The facility of claim 1, wherein said layer of hay or straw is approximately six inches thick.

13. The facility of claim 12, wherein said layer of topsoil is approximately six inches thick.

14. The facility of claim 1, wherein said layer of topsoil is approximately six inches thick.

15. The facility of claim 14, wherein said layer of large gravel particles is approximately ten inches thick.

16. The system of claim 15, including a chlorinator downstream from said sump and means for directing effluent from the sump to the chlorinator.

17. The system of claim including a chlorine contact chamber downstream from said chlorinator and means for directing effluent from sad chlorinator to said chlorine contact chamber.

18. A system of treating sewage generated by a plurality of residential dwellings each having a septic tank for initial treatment, said system comprising:
   a gravity flow treatment bed having a water impervious floor sloping downwardly from a high end to a low end and water impervious walls extending around the floor;
   a header pipe for receiving incoming effluent, said header pipe extending transversely across the high end of said treatment bed and being perforated to distribute the effluent across the width of the bed;

conduit means extending from each septic tank to said header pipe to convey the output effluent from each tank to the header pipe;

a layer of small gravel particles on the floor;

a layer of large gravel particles on said layer of small gravel particles, said large gravel particles being larger than said small gravel particles;

a strip of limestone in said layer of large gravel particles extending transversely across substantially the entirety of the treatment bed;

a layer of straw of hay on said layer of large gravel particles;

a layer of topsoil on said layer of straw or hay;

a plurality of reed plants planted in said topsoil and having roots capable of penetrating the layer of straw or hay and the layers of large and small gravel particles;

a perforated collection pipe extending transversely across the low end of said treatment bed at a location to receive effluent that has passed through the bed;

a sump adjacent the low end of the treatment bed, said sump having an outlet; and a discharge pipe extending from said collection pipe to said sump to deliver the treated effluent to the sump, said discharge pipe including a riser pipe in said sump having an open top end to control the level of liquid in the treatment bed.

19. A method of treating sewage emanating at a plurality of residential dwellings, said method comprising the steps of:

treating the sewage in individual septic tanks, one of which is located at each dwelling;

directing the effluent from the septic tanks into a single treatment bed which serves all of the septic tanks and which is sloped to effect gravity flow of liquid through the bed from a high end to a low end;

planting reeds in the treatment bed having roots effective to remove pollutants from the liquid;

providing in the treatment bed a strip of limestone effective to neutralize acids in the liquids passing therethrough;

collecting treated liquid in a sump located adjacent the low end of the treatment bed;

directing the liquid through a chlorinator effective to chlorinate same;

passing the liquid through a chlorine contact chamber located downstream from the chlorinator; and discharging the water from the chlorine contact chamber to the ground water.

20. The method of claim 19, including the steps of:

providing in said treatment bed a base layer of small gravel particles which functions as a sand filter while the reed plants are becoming established;

providing on said base layer a layer of larger gravel particles through which the effluent can flow;

providing on said layer of larger gravel particles a layer of hay or straw; and providing on said layer of hay or straw a layer of topsoil in which the reed plants are planted, said hay or straw preventing leaching of the topsoil down into the layers of gravel particles.

* * * * *